United States Patent
Merz et al.

(10) Patent No.: US 10,421,438 B2
(45) Date of Patent: Sep. 24, 2019

(54) FIN RAY-TYPE WIPER COMPRISING A FLEXIBLE STRUCTURE OPTIMIZED FOR DEMOLDING

(71) Applicant: Robert Bosch GmbH, Stuttgart (DE)

(72) Inventors: Jochen Merz, Rosenfeld-Isingen (DE); Hartmut Nafz, Deilingen (DE); Michael Weiler, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 15/525,394

(22) PCT Filed: Nov. 9, 2015

(86) PCT No.: PCT/EP2015/076004
§ 371 (c)(1),
(2) Date: May 9, 2017

(87) PCT Pub. No.: WO2016/075057
PCT Pub. Date: May 19, 2016

(65) Prior Publication Data
US 2017/0320468 A1  Nov. 9, 2017

(30) Foreign Application Priority Data
Nov. 11, 2014  (DE) .................. 10 2014 222 971

(51) Int. Cl.
*B60S 1/38*  (2006.01)
*B29C 45/33*  (2006.01)
(Continued)

(52) U.S. Cl.
CPC ............ *B60S 1/3801* (2013.01); *B29C 45/33* (2013.01); *B60S 1/38* (2013.01); *B29L 2031/305* (2013.01);
(Continued)

(58) Field of Classification Search
CPC ... B29C 45/00; B29C 45/33; B29L 2031/305; B60S 1/3427; B60S 1/3801; B60S 1/38;
(Continued)

(56) References Cited

U.S. PATENT DOCUMENTS 3,131,414 A   5/1964  Wise
6,301,742 B1  10/2001 Kota

FOREIGN PATENT DOCUMENTS

CN    1376121 A   10/2002
CN    101547815 A   9/2009
(Continued)

OTHER PUBLICATIONS

International Search Report for Application No. PCT/EP2015/076004 dated Jan. 19, 2016 (English Translation, 2 pages).

*Primary Examiner* — Gary K. Graham
(74) *Attorney, Agent, or Firm* — Michael Best & Friedrich LLP (57) ABSTRACT

The invention relates to a windshield wiper device for a vehicle, for wiping a window (4), comprising a wiper blade (2) that has an elongate upper part (10) and an elongate lower part (12) which are at least partly flexible. Also provided is a plurality of connecting elements (18) for connecting the upper part (10) and the lower part (12), the connecting elements (18) being spaced apart along a longitudinal direction (8) of the wiper blade (2) and being attached to the upper part (10) and/or the lower part (12) by a rotary joint (20), and the connecting elements (18) being designed to allow a motion of the upper part (10) and the lower part relative to each other with a motion component along the longitudinal direction (8) of the wiper blade (2). Each connecting element (18) extends along a longitudinal axis (24) of the connecting element (18) and along a transverse axis (25) running perpendicular to the longitudinal axis (24), which runs from the upper part (10) to the
(Continued)

lower part (12). The transverse axes (25) of at least two connecting elements (18) adjoining each other along the longitudinal direction (8) define a demolding angle (β) of at least 0.5° relative to one another.

14 Claims, 6 Drawing Sheets

(51) Int. Cl.
 *B60S 1/34* (2006.01)
 *B29L 31/30* (2006.01)

(52) U.S. Cl.
 CPC ...... *B60S 1/3427* (2013.01); *B60S 2001/3812* (2013.01); *B60S 2001/3825* (2013.01); *B60S 2001/3898* (2013.01)

(58) Field of Classification Search
 CPC ...... B60S 2001/3812; B60S 2001/3825; B60S 2001/3898
 USPC .............................................. 264/328.1, 334
 See application file for complete search history.

(56) References Cited

FOREIGN PATENT DOCUMENTS

| | | |
|---|---|---|
| DE | 1704202 A1 | 10/1971 |
| DE | 102013214064 | 5/2014 |

FIN RAY-TYPE WIPER COMPRISING A FLEXIBLE STRUCTURE OPTIMIZED FOR DEMOLDING

BACKGROUND OF THE INVENTION

The invention relates to a windshield wiper device for a vehicle, in particular a motor vehicle, and to a method for producing a wiper blade for a windshield wiper device.

Windshield wiper devices typically have a wiper arm or wiper lever, wherein a wiper blade is moved over the windshield of a motor vehicle. The wiper blade is moved here between a first turning position and a second turning position. For this purpose, the wiper arm is connected via a drive shaft to a wiper motor. In particular on windshields having pronounced changes in curvature, the wiper blade easily loses contact with the windshield. This may result, in particular in the case of windshields having a pronounced curvature, in wiping areas not being wiped or in smearing.

Since a wiping operation has to be optimized for a multiplicity of parameters, such as, for example, the amount of rain falling on the windshield, a possible snow loading occurring on the windshield, the speed of the vehicle and associated wind pressure on the wiper arm, smearing cannot be reliably prevented in a simple manner by adaptation of the pressure of the wiper arm on the windshield. There is therefore a need for further improvement of windshield wiper devices.

There are a plurality of boundary conditions which should additionally be taken into consideration for improvement purposes. There is also a need here to ensure simple and cost-effective production of the wiper blade.

SUMMARY OF THE INVENTION

It is the object of the present invention to ensure a reliable and substantially smear-free wiping of a windshield of a vehicle, wherein the production of the wiper blade is simplified.

This object is achieved by a windshield wiper device and a method according to the invention.

According to an embodiment of the present invention, a windshield wiper device for a vehicle, in particular a motor vehicle, is proposed. The windshield wiper device comprises a wiper arm with a wiper blade with an elongate upper part and an elongate lower part, which are configured to be at least partially bendable. Furthermore, a plurality of connecting elements for connecting the upper part and the lower part are provided, wherein the connecting elements are spaced apart from one another along a longitudinal extent of the wiper blade and are attached to the upper part and/or to the lower part by means of a rotary joint. In particular, the connecting elements are designed in order to permit a movement of the upper part and of the lower part relative to each other with a movement component along the longitudinal extent of the wiper blade. The connecting elements are designed in such a manner that they each extend along a longitudinal axis of the relevant connecting element, which longitudinal axis runs from the upper part to the lower part, and each extend along a transverse axis running perpendicularly to the longitudinal axis. In this case, the transverse axes of at least two connecting elements which are adjacent along the longitudinal extent enclose a demolding angle of at least 0.5° with respect to each other.

According to a further embodiment of the present invention, a method for producing a wiper blade for a windshield wiper device for a vehicle, in particular a motor vehicle, is proposed. The method comprises providing an injection molding die suitable for the injection molding of the wiper blade, wherein the wiper blade has an elongate upper part, an elongate lower part and a plurality of connecting elements for connecting the upper part and the lower part, wherein the connecting elements are spaced apart from one another along a longitudinal extent of the wiper blade and in particular are attached to the upper part and/or to the lower part by means of a rotary joint. The connecting elements each extend along a longitudinal axis of the connecting element, which longitudinal axis runs from the upper part to the lower part, and along a transverse axis running perpendicularly to the longitudinal axis, wherein the transverse axes of at least two connecting elements which are adjacent along the longitudinal extent enclose a demolding angle of at least 0.5° with respect to each other. Furthermore, the wiper blade is injection molded using the injection molding die provided with the demolding angle, and the wiper blade is demolded from the injection molding die.

According to the embodiments described here of the invention, windshield wiper devices for vehicles can be produced in a particularly favorable manner and for a plurality of different fields of use. In particular, demolding can be improved when the wiper blade is injection molded.

According to an embodiment of the present invention, a windshield wiper device for a vehicle, in particular a motor vehicle, is proposed. The windshield wiper device comprises a wiper arm with a wiper blade with an elongate upper part and an elongate lower part, which are configured to be at least partially bendable. Furthermore, a plurality of connecting elements for connecting the upper part and the lower part are provided, wherein the connecting elements are spaced apart from one another along a longitudinal extent of the wiper blade and are attached to the upper part and/or to the lower part by means of a rotary joint. In particular, the connecting elements are designed in order to permit a movement of the upper part and of the lower part relative to each other with a movement component along the longitudinal extent of the wiper blade. The connecting elements are designed in such a manner that they each extend along a longitudinal axis of the relevant connecting element, which longitudinal axis runs from the upper part to the lower part, and each extend along a transverse axis running perpendicularly to the longitudinal axis and have a predetermined wall thickness. In this case, the transverse axes of at least two connecting elements which are adjacent along the longitudinal extent enclose a demolding angle of at least 0.5° with respect to each other.

According to a further embodiment of the present invention, a method for producing a wiper blade for a windshield wiper device for a vehicle, in particular a motor vehicle, is proposed. The method comprises providing an injection molding die suitable for the injection molding of the wiper blade, wherein the wiper blade has an elongate upper part, an elongate lower part and a plurality of connecting elements for connecting the upper part and the lower part, wherein the connecting elements are spaced apart from one another along a longitudinal extent of the wiper blade and are attached to the upper part and/or to the lower part by means of a rotary joint, wherein the connecting elements each extend along a longitudinal axis of the connecting element, which longitudinal axis runs from the upper part to the lower part, and are extended along a transverse axis running perpendicularly to the longitudinal axis, wherein the transverse axes of at least two connecting elements which are adjacent along the longitudinal extent enclose a demolding angle of at least 0.5° with respect to each other. Furthermore, the wiper blade is injection molded using the injection molding die provided with the demolding angle, and the wiper blade is demolded from the injection molding die.

According to yet further embodiments, the demolding angle can have a value within a range of 0.5° to 45°, typically a value within a range of 1° and 10°, and in particular a value of approximately 3°. By means of such an adjustment of the demolding angle, it is expediently possible to ensure simple and cost-effective demolding of the wiper blade from an injection molding die provided for the production of the wiper blade.

According to yet further embodiments, the connecting elements between the upper part and the lower part along the longitudinal extent of the wiper blade can be arranged in such a manner that consecutive connecting elements are pivoted about their respective longitudinal axes toward the wiper blade head and away from the latter in an alternating manner. This affords the advantage that production of the wiper blade can be carried out with a particularly simple injection molding die. In particular, it is expedient if the connecting elements between the upper part and the lower part along the longitudinal extent of the wiper blade are pivoted alternately about their longitudinal axes in such a manner that a constant demolding angle is provided between the transverse axes of adjacent connecting elements.

According to yet further embodiments, the upper part and/or the lower part and/or one or more connecting elements can contain a material which is selected from the group which consists of a polymethylmethacrylate, a polymer, a fiber composite material, carbon, POM, PA, TPE (thermoplastic elastomer), in particular TPE-S, TPE-O, TPE-U, TPE-A, TPE-V, TPE-E, . . . , or any combination thereof. This affords the advantage that, by means of a suitable selection of material, physical properties, for example mechanical properties, of the wiper arm or of components of the wiper blade can be adapted. Furthermore, it is possible to realize components of the wiper arm, for example the wiper blade head or the wiper blade, as integral components by injection molding, as a result of which advantages in terms of manufacturing are obtained which permit a cost-effective production of the windshield wiper device. In particular, it is advantageous if the wiper blade head together with the wiper blade is realized as an integral component by injection molding.

According to yet further embodiments, the connecting elements and/or the rotary joints can have a virtually constant wall thickness, wherein the wall thickness lies within a range of between 0.3 mm and 5 mm, typically within a range of between 0.5 mm and 3 mm, in particular at approximately 2 mm. This affords the advantage that overall a wiper blade can be provided which functions particularly readily according to the "Finray" principle. Also, the wall thickness of the rotary joint can lie within a range of between 0.2 mm and 1 mm and the wall thickness of the connecting elements can lie within a range of 1 mm to 5 mm.

According to yet further embodiments, the injection molding of the wiper blade can be carried out using plasticized plastic. This permits a particularly cost-effective production of the wiper blade.

According to yet further embodiments, the injection molding of the wiper blade can be carried out with an injection molding die which has trapezoidal demolding blocks. This provides a wiper blade construction in which the connecting elements between the upper part and the lower part along the longitudinal extent of the wiper blade are arranged in such a manner that consecutive connecting elements are pivoted about their respective longitudinal axes toward the wiper blade head and away from the latter in an alternating manner. This can result in an advantageous manner in the simplification or sturdiness of the manufacturing of the windshield wiper device and in further cost reductions.

BRIEF DESCRIPTION OF THE DRAWINGS

Exemplary embodiments of the invention are illustrated in the figures and are described in more detail below. In the figures.

DETAILED DESCRIPTION

Unless noted otherwise, the same reference numbers are used below for identical and identically acting elements.

Figure 1:
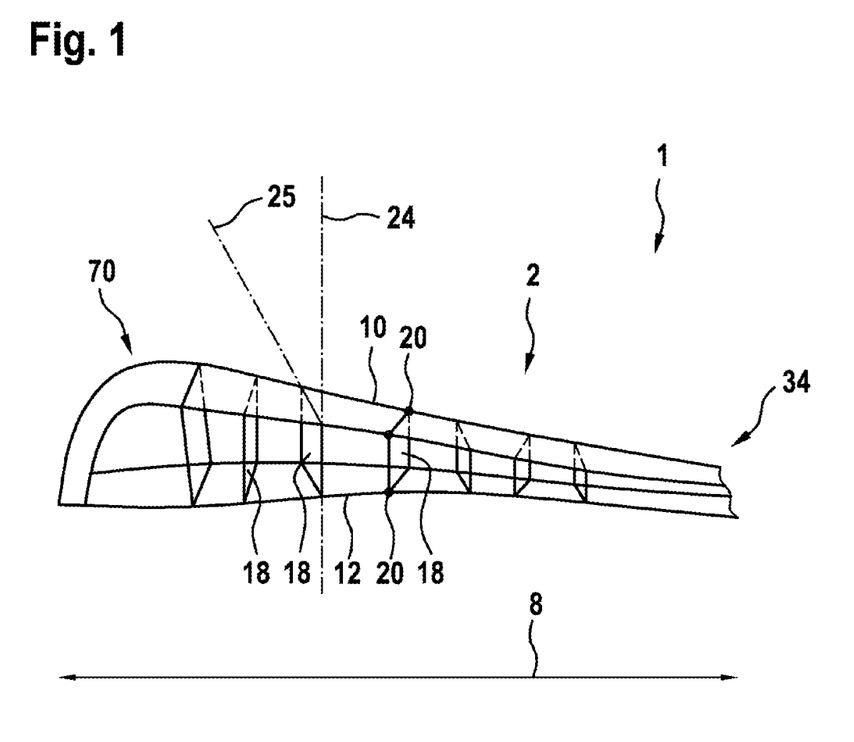
FIG. 1 shows a perspective illustration of a wiper arm of a windshield wiper device, wherein the wiper arm has a wiper blade head and a wiper blade with an arrangement, which is optimized for demolding, of connecting elements, according to embodiments of the invention.

FIG. 1 shows a perspective illustration of a wiper arm 1 of a windshield wiper device, wherein the wiper arm 1 has a wiper blade head 70 and a wiper blade 2 with an arrangement, optimized for demolding, of connecting elements 18, according to embodiments of the invention. The wiper blade 2 extends here from the wiper blade head 70 to a connecting position 34.

According to embodiments, the wiper blade 2 has an elongate upper part 10 and an elongate lower part 12, which are configured to be at least partially bendable, wherein the lower part 12 faces a windshield 4 during operation of the windshield wiper device. Furthermore, a plurality of connecting elements 18 for connecting the upper part 10 and the lower part 12 are provided, wherein the connecting elements 18 are spaced apart from one another along a longitudinal extent 8 of the wiper blade and are attached to the upper part 10 and/or to the lower part 12 by means of a rotary joint 20. The connecting elements 18 are designed in order to permit a movement of the upper part 10 and of the lower part 12 relative to each other with a movement component along the longitudinal extent 8 of the wiper blade 2. In this connection, the connecting elements on the upper part 10 are connected at a respective upper connecting position and on the lower part 12 at a respective lower connecting position. For example, a respective rotary joint 20 is provided at the connecting positions. During a movement of the upper part 10 and of the lower part 12 relative to each other, the spacing of an upper connecting position from a lower connecting position on the same connecting element does not substantially change, i.e. the spacing is constant with deviations of, for example, ±1 mm, in particular ±0.3 mm.

The connecting elements 18 are fastened to mutually facing inner longitudinal sides of the upper part 10 and of the lower part 12 by the rotary joints or hinges 20. Particularly advantageously for the production of the wiper blade 2, the configuration of the rotary joints 20 can be designed as film hinges. Embodiments in which the joints 20 are provided by film hinges therefore provide a very simple way of providing the joints 20 for a Finray wiper. The wiper blade 2 can be provided in one piece, in particular in ready-from-the-mold form.

Along the longitudinal extent 8 of the wiper blade 2, the spacing between the upper part 10 and the lower part 12 becomes smaller from the wiper blade head, at least in regions of the longitudinal extent 8 of the wiper blade 2 or in a predominant part of the longitudinal extent 8 of the wiper blade 2, see FIGS. 5A, 5B, 6 and 7. From the head end, the height of the wiper blade 2 tapers in a wedge-shaped manner in regions or becomes smaller in regions of the longitudinal extent 8. For example, according to embodiments for a plurality of the connecting elements 18, the length of the connecting elements 18 can be provided in such a manner that the connecting elements 18 provided in the vicinity of the wiper blade head are longer than those on the opposite side of the wiper blade 2 along the longitudinal extent 8. The wiper blade head 70 can be attached to a drive shaft in such a manner that rotation of the wiper arm 1 about a drive axis is made possible.

These properties make it possible to provide a wiper blade 2 which functions according to the Finray principle. The Finray effect will be explained below in particular with reference to FIGS. 5A, 5B, 6 and 7.

Figure 2:
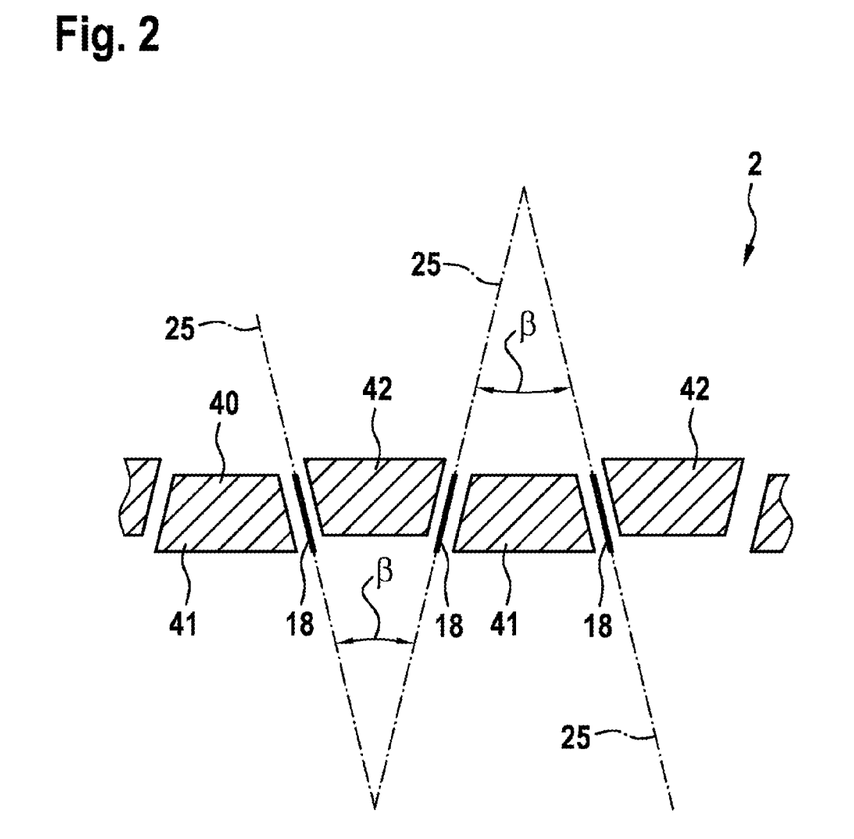
FIG. 2 shows a partial view of an injection molding die in an injection molding position for producing the wiper blade illustrated in FIG. 1, according to embodiments of the invention.
Figure 3:
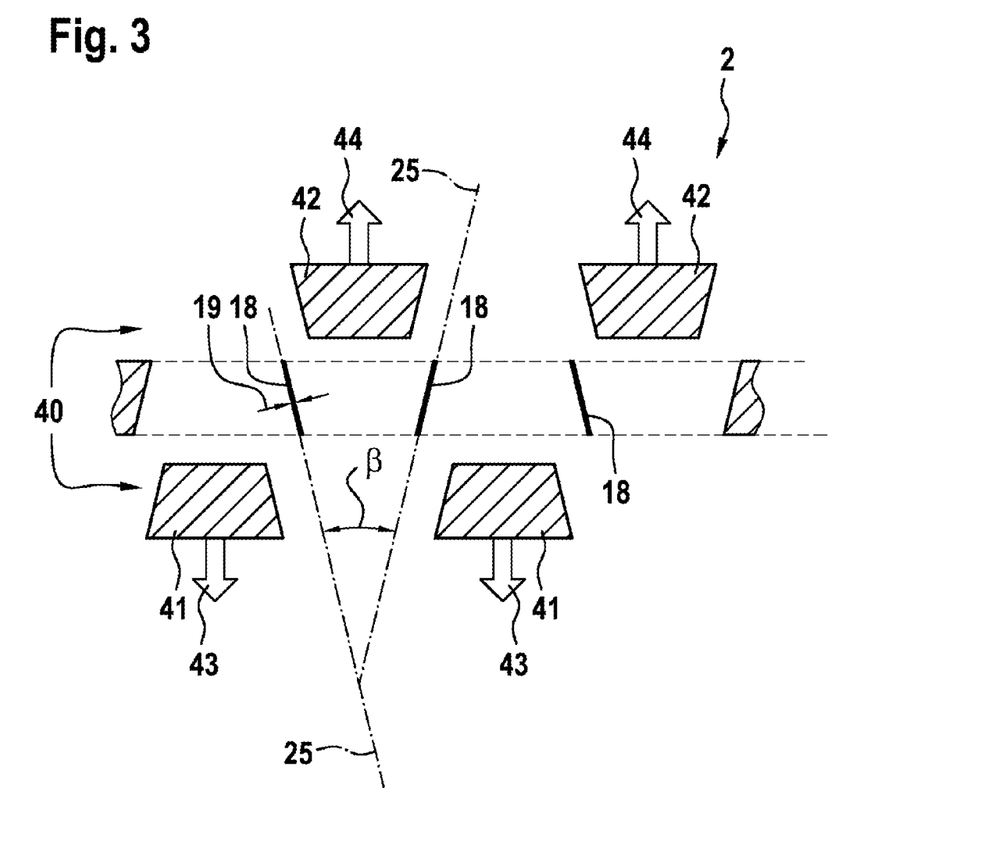
FIG. 3 shows partial views of the injection molding die and of the wiper blade produced after the demolding of the wiper blade from the injection molding die, according to embodiments of the invention.

FIGS. 2 and 3 relate to the production of a wiper blade 2 according to embodiments of the invention. In this connection, FIG. 2 shows a partial view of an injection molding die 40 in an injection molding position for producing the wiper blade 2 illustrated in FIG. 1, wherein the wiper blade 2 is illustrated in a view from below, i.e. in a plan view of the lower part 12 of the wiper blade 2 from below or in a view which corresponds to a section through the wiper blade 2 in a plane approximately parallel to the windshield 4. FIG. 3 shows partial views of the injection molding die 40 sketched in FIG. 2 and of the wiper blade 2 produced after the wiper blade 2 of the molding from the injection molding die 40. FIG. 3 likewise illustrates a view from below or a view which corresponds to a section through the wiper blade 2 in a plane approximately parallel to the windshield 4.

As illustrated by way of example using one of the connecting elements 18 in FIG. 1, the connecting elements 18 are constructed in such a manner that they each extend along a longitudinal axis 24 of the relevant connecting element 18, which longitudinal axis runs from the upper part 10 to the lower part 12, and each extend along a transverse axis 25 running perpendicularly to the longitudinal axis 24 and have a predetermined wall thickness 19, also see FIG. 3. In this connection, the transverse axes 25 of at least two connecting elements which are adjacent along the longitudinal extent enclose a demolding angle β with respect to each other which is illustrated in FIG. 2 and differs from zero, in particular is at least 0.5°.

According to yet further embodiments that can be combined with embodiments described herein, the demolding angle β can have a value within a range of 0.5° to 45°, typically a value within a range of 2° and 15°, and in particular a value of approximately 5°. This produces simple and cost-effective demolding of the wiper blade 2 from an injection molding die 40 provided for the production of the wiper blade 2. In particular, the connecting elements 18 between the upper part 10 and the lower part 12 along the longitudinal extent 8 of the wiper blade 2 can be arranged in such a manner that consecutive connecting elements 18 are pivoted about their respective longitudinal axes 8 toward the wiper blade head 70 and away from the latter in an alternating manner. This affords the advantage that production of the wiper blade 2 can take place with a particularly simple injection molding die 40, as illustrated in FIGS. 2 and 3. In particular, it is expedient if the connecting elements 18 between the upper part 10 and the lower part 12 along the longitudinal extent 8 of the wiper blade 2 are pivoted alternately symmetrically about their longitudinal axes 24 in such a manner that a constant demolding angle β between the transverse axes 25 of adjacent or consecutive connecting elements 18 is provided.

In the partial view of FIG. 2 which shows the wiper blade 2 in a detail from below, the injection molding die 40 is illustrated in an injection molding position or molding position. The transverse axes 25 of adjacent connecting elements 18 have here an angle with respect to each other, i.e. the demolding angle β. It should be pointed out here that FIG. 2 is not necessarily true to scale, i.e. the demolding angle β can be substantially smaller than illustrated in FIG. 2. The injection molding die 40 or demolding die has two rows of demolding blocks, i.e. first demolding blocks 41 and second demolding blocks 42.

As illustrated in FIGS. 2 and 3, the injection molding die 40 comprises trapezoidal demolding blocks 41, 42, and therefore the shown oblique configuration of the connecting elements 18 is made possible by a provided trapezoidal angle. By means of such a design of the injection molding die 40 with the trapezoidal demolding blocks 41, 42, connecting elements 18 which have a uniform or constant wall thickness 19 can be provided in an advantageous manner, see FIG. 3, wherein the rotary joints or film hinges 20 can likewise have a constant wall thickness.

According to yet further embodiments which can be combined with embodiments described herein, the described production method for a wiper blade 2 makes it possible for the connecting elements 18 and/or the rotary joints or hinges or film hinges 20 to have a virtually constant wall thickness 19, wherein the wall thickness 19 can lie within a range of between 0.3 mm and 5 mm, typically within a range of between 0.5 mm and 3 mm, in particular at approximately 2 mm. This affords the advantage that overall a wiper blade 2 can be provided which functions particularly readily according to the Finray principle.

FIG. 3 shows partial views of the injection molding die 40 sketched in FIG. 2 and of the wiper blade 2 already produced after the wiper blade 2 is demolded from the injection molding die 40, according to embodiments of the invention, wherein the wiper blade 2 is illustrated in a view from below, i.e. in a plan view of the lower part 12 of the wiper blade 2 from below or in a view which corresponds to a section through the wiper blade 2 in a plane approximately parallel to the windshield 4. In order to reach the situation illustrated in FIG. 2, the first row of demolding blocks 41 has been pulled away in a first demolding direction 43 while the second row of demolding blocks 42 has been pulled away—simultaneously or subsequently—in a second demolding direction 44. As illustrated in FIG. 3, after removal of the injection molding die 40 or after demolding of the wiper blade 2 from the injection molding die 40, trapezoidal apertures are therefore formed.

Figure 4:
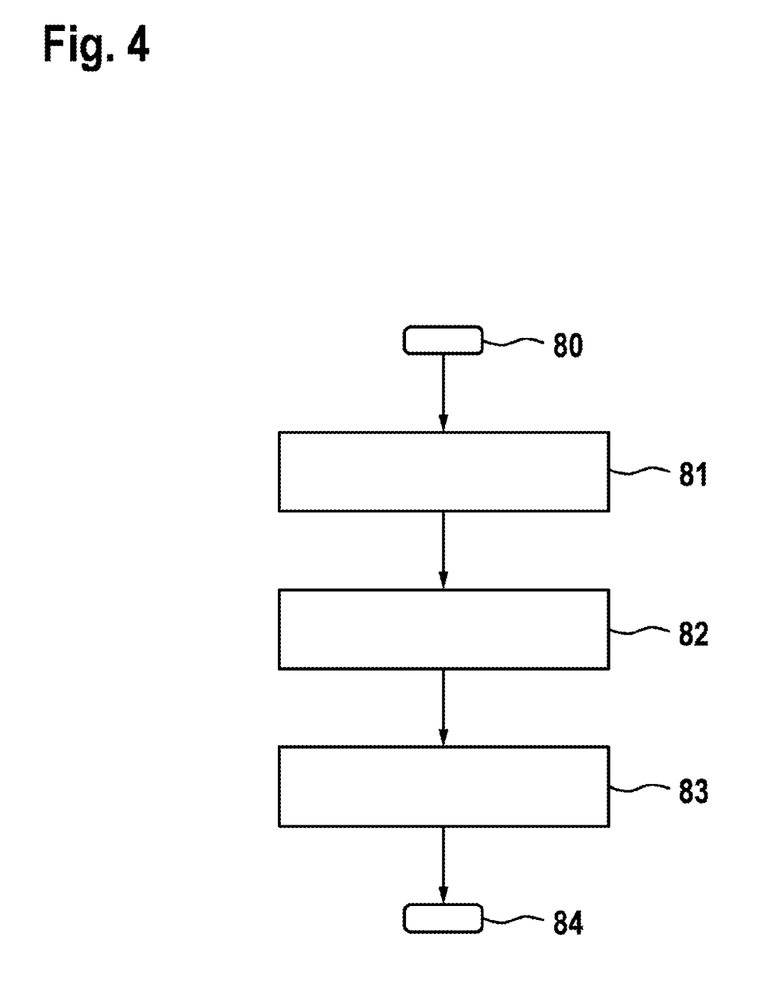
FIG. 4 shows a diagram for illustrating a method for producing a wiper blade for a windshield wiper device, according to embodiments of the invention.

FIG. 4 is a diagram for illustrating a method for producing a wiper blade 2 for a windshield wiper device, according to embodiments of the invention. The procedure begins in a block 80. Subsequently, in a block 81, an injection molding die 40 is provided which is suitable for the injection molding of the wiper blade 2. The wiper blade 2 to be manufactured has an elongate upper part 10, an elongate lower part 12 and a plurality of connecting elements 18 for connecting the upper part 10 and the lower part 12, wherein the connecting elements 18 are spaced apart from one another along the longitudinal extent 8 of the wiper blade 2 and are attached to the upper part 10 and/or to the lower part 12 by means of a rotary joint 20. The connecting elements 18 are each expanded along the connecting element longitudinal axis 24 which extends from the upper part 10 to the lower part 12, and along a transverse axis 25 running perpendicularly to the longitudinal axis 24.

The transverse axes 25 of at least two connecting elements 18 which are adjacent along the longitudinal extent 8 enclose a demolding angle β of at least 0.5° with respect to one another. In a block 82, the wiper blade 2 is injection molded using the injection molding die 40 provided with the demolding angle β. Subsequently, the wiper blade 2 is demolded from the injection molding die 40, see block 83. The procedure ends in a block 84.

According to yet further embodiments which can be combined with embodiments described herein, the injection molding of the wiper blade 2 can be carried out using plasticized plastic. A particularly cost-effective production of the wiper blade is made possible in this manner.

According to yet further embodiments, the upper part 10 and/or the lower part 12 and/or one or more connecting elements 18 can contain a material which is selected from the group which consists of a polymethylmethacrylate, a polymer, a fiber composite material, carbon, POM, PA, TPE (thermoplastic elastomer), in particular TPE-S, TPE-O, TPE-U, TPE-A, TPE-V, TPE-E, . . . , or any combination thereof. This affords the advantage that physical properties, such as, for example, mechanical properties of the wiper arm 1 or of components of the wiper blade 2 can be adapted by a suitable selection of material. Furthermore, it is possible to form components of the wiper arm 1, such as, for example, the wiper blade head 70 or the wiper blade 2, as integral parts by injection molding, as a result of which advantages can be achieved in terms of manufacturing and which permit a cost-effective production of the windshield wiper device. In particular, it is advantageous if the wiper blade head 70 is realized together with the wiper blade 2 as an integral component by injection molding.

Aspects of an exemplary windshield wiper device, for which the embodiments of the windshield wiper device that are described herein, in particular the arrangement of the connecting elements 18 of the wiper blade 2, are particularly advantageous, are described below. To provide the Finray effect explained in more detail below with reference to FIGS. 5A, 5B, 6 and 7, above all the connecting elements 18 are designed so as to be movable about an associated connecting point 20 in order to permit a movement of the upper part 10 and of the lower part 12 relative to each other with a movement component along the longitudinal extent 8 of the wiper blade 2.

Figure 5A:
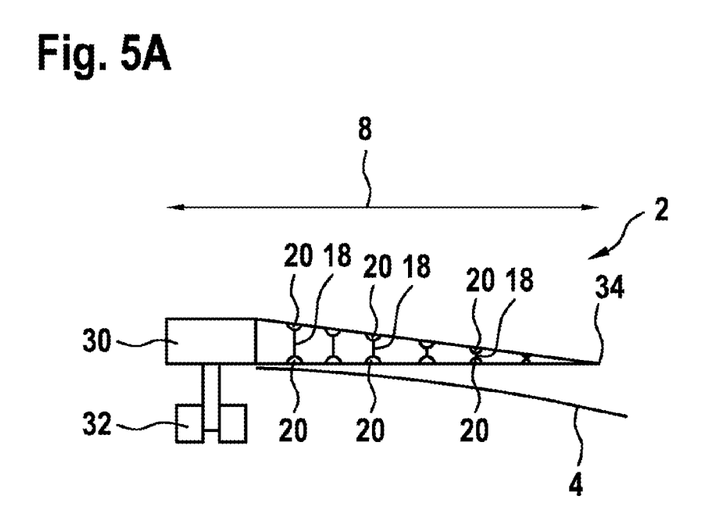
FIG. 5A shows a schematic illustration of a further exemplary embodiment of a windshield wiper device according to the invention in the form of a wiper arm with an integrated wiper blade in a basic position.
Figure 5B:
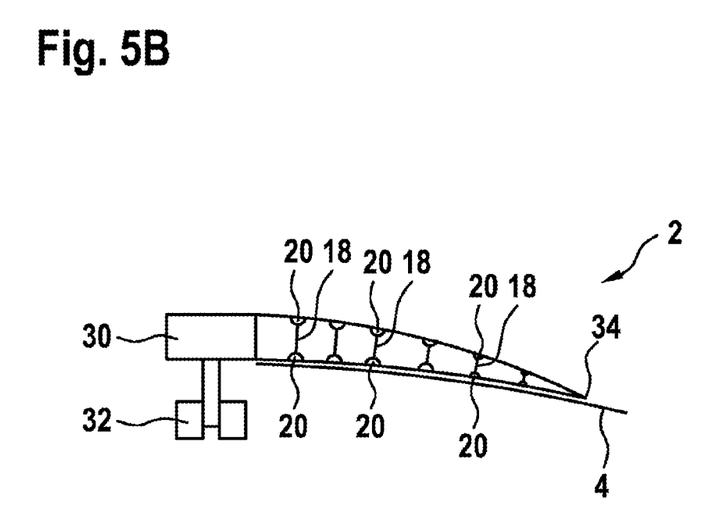
FIG. 5B shows a schematic illustration of the wiper arm with an integrated wiper blade according to FIG. 5A in a position placed against a windshield.

FIGS. 5A and 5B show schematic illustrations of a wiper blade 2 in a basic position and in a position placed against a windshield, according to embodiments of the windshield wiper device of the disclosure. Finray wipers for which the arrangement of the connecting elements 18 of the wiper blade 2 according to the embodiments described here is particularly useful are described. This arrangement of the connecting elements 18 is not illustrated again in FIGS. 5A, 5B, 6 and 7 and can also be provided in these embodiments, as previously described. The wiper blade 2 serves for wiping the windshield 4 of a vehicle which is, for example, a motor vehicle, in particular a car. The wiper blade 2 has a longitudinal extent 8 and has an elongate upper part 10 and a likewise elongate lower part 12. The longitudinal extent 8 of the upper part 10 and of the lower part 12 substantially correspond to the longitudinal extent 8 of the wiper blade 2.

Both the upper part 10 and the lower part 12 are bendable beams or may be configured as bendable beams. It is likewise possible for in each case only one part of the upper part 10 and/or of the lower part 12 to be configured to be bendable. According to some embodiments that may be combined with the other embodiments described here, a material that has a modulus of elasticity in a range between 0.005 kN/mm$^2$ and 0.5 kN/mm$^2$, in particular 0.01 kN/mm$^2$ and 0.1 kN/mm$^2$, is used for the upper part 10 and/or the lower part 12. This makes it possible to realize suitable bendability of the upper part 10 and of the lower part 12. Together with a suitably configured cross-sectional area of the upper part 10 and of the lower part 12, optimum flexural rigidity is thus attained.

The upper part 10 and the lower part 12 are fastened to a wiper-blade-side fastening part 30. The windshield wiper device can be connected to the vehicle or to the drive shaft 33 of a windshield wiper drive unit 32 (wiper motor) of the vehicle by means of the wiper-blade-side fastening part 30, for example with a quick fix fastening. Such a quick fix fastening can rapidly releaseably connect the drive shaft 33 of the windshield wiper device to the wiper arm 1.

On the side which lies opposite the fastening part 30 along the longitudinal extent 8 of the windshield wiper device, the upper part 10 and the lower part 12 are connected at the connecting position 34. The upper part 10 and the lower part 12 are connected to each other by connecting elements 18. The connecting elements 18 are configured in such a manner that the spacing of the connecting position to the upper part 10 and the spacing of the connecting position to the lower part 12 changes by at maximum +/−1 mm, in particular by at maximum +/−0.3 mm (for example by thermal expansion and/or tension and compressive loading). The connecting elements 18 can therefore be of substantially inelastic design or the effect of the connecting elements 18 is based on the force transmission thereof between upper part 10 and lower part 12 and not on the elasticity thereof.

The connecting elements 18 are fastened to mutually facing inner longitudinal sides of the upper part 10 and of the lower part 12 by means of rotary joints 20. The rotary joints 20 are typically hinges. In particular, the rotary joints 20 may be in the form of film hinges. This is advantageous in particular if the upper part 10, the lower part 12 and/or the connecting elements 18 are produced from a plastics material or are coated with a suitable plastics material.

According to typical embodiments described here, which may be combined with other embodiments described here, a rotary joint 20 is selected from the following group consisting of: a hinge, a film hinge, a narrowing of the material for the purpose of generating reduced rigidity along a torsional axis, a joint with an axis of rotation, a means for connecting the upper part to the connecting element or for connecting the lower part to the connecting element, which means permits the displacement of the lower part in relation to the upper part along the longitudinal extent, etc.

Embodiments in which the joints 20 are provided by film hinges thus constitute a very simple way of providing the joints 20 for a Finray wiper. The wiper blade 2 may be provided in one piece, in particular in ready-from-the-mold form. According to typical embodiments, the film hinges exhibit high ductility. This can be provided, for example, by means of a material selected from the group PP, PE, POM and PA. Alternatively, the film hinges may be produced from one or more materials from a group consisting of: TPE (thermoplastic elastomer), for example TPE-S, TPE-O, TPE-U, TPE-A, TPE-V and TPE-E.

The connecting elements 18 are spaced apart from one another along the longitudinal extent 8 of the wiper blade 2. The spacings are advantageously less than 50 mm, in particular less than 30 mm. In this way, it is possible to ensure particularly great flexibility of the windshield wiper device, in particular of its lower part 12, and good adaptation to the curvature and changes in curvature of the windshield 4 to be wiped.

FIG. 5B shows a schematic illustration of the wiper blade 2 according to FIG. 5A in a position placed against the windshield 4. Since the windshield 4 has a curvature, contact pressure forces act on the lower part 12 when the wiper blade 2 is placed against the windshield 4. Since the upper part 10 and the lower part 12 are bendable beams and the connecting elements 18 are mounted rotatably on upper part 10 and lower part 12, the upper part 10 and the lower part 12 are displaceable in relation to each other. By means of the compressive forces acting on the lower part 12 from below, the wiper blade 2 bends in the same direction from which the compressive forces come and is placed precisely against the curvature of the windshield 4.

By means of the construction of the embodiments described here, in the event of an action of force on the lower part 12 (by means of the windshield 4), the lower part 12 bends in the direction from which the force acts. This is provided by the connection of the upper part 10 and of the lower part 12 at the connecting position 34, by the shape and by rotary joints 20 at the connection between the connecting elements 18 and the upper or lower part. A windshield wiper device according to embodiments described here uses the effect of tail fins of certain fish, which tail fins do not yield in the direction of pressure in the event of lateral pressure, but rather arch in the opposite direction, i.e. in the direction from which the pressure comes. This principle is also referred to as the Finray principle. As a result, a windshield wiper device according to the embodiments described herein has the advantage of improved adaptation to a windshield 4 of a motor vehicle. In the case of a conventional windshield wiper blade, the upper part thereof is customarily rigid, i.e. it is not of bendable design.

Figure 6:
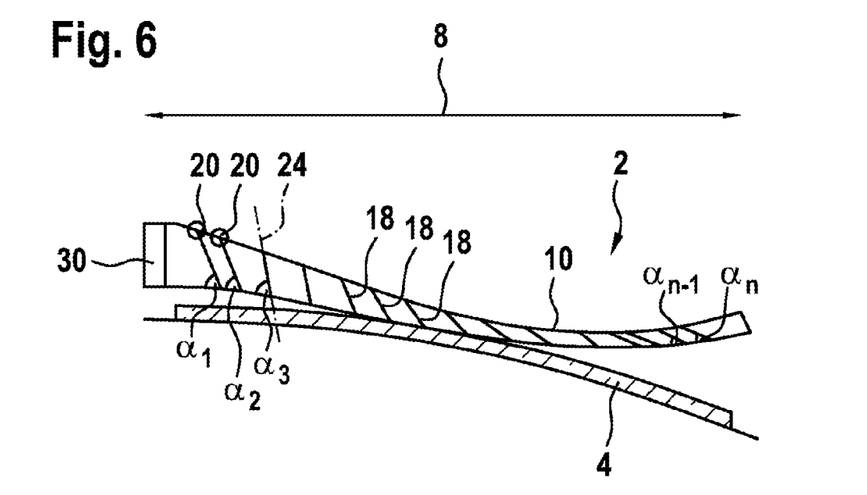
FIG. 6 shows a schematic illustration of a wiper blade according to embodiments of the present invention in a basic position.
Figure 7:
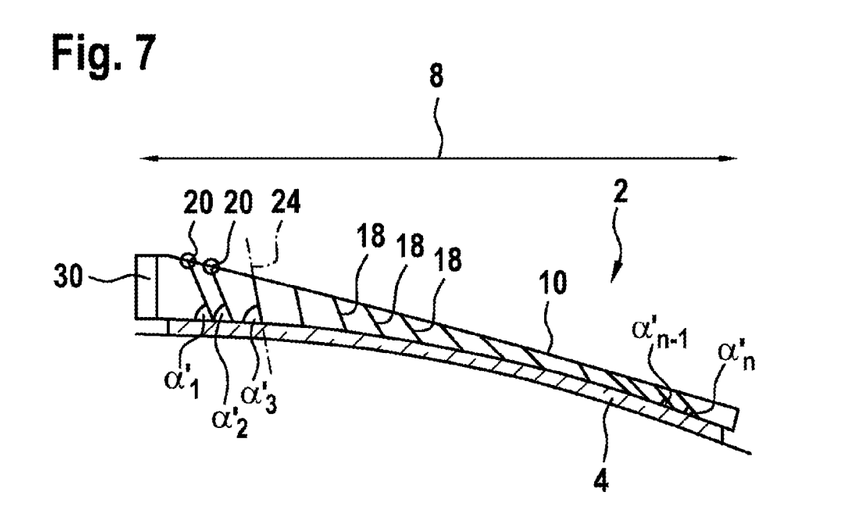
FIG. 7 shows a schematic illustration of a wiper blade according to embodiments of the present invention in a position placed against a windshield.

FIGS. 6 and 7 show schematic illustrations of a wiper blade 2 of a windshield wiper device for a vehicle, in particular for a motor vehicle, in a basic position (FIG. 6), i.e. in an unloaded state, and in a position placed against a windshield 4 (FIG. 7), according to the embodiments described herein. The wiper blade 2 comprises an elongate upper part 10 and an elongate lower part 12, which are configured to be at least partially bendable. Furthermore, a plurality of connecting elements 18 for connecting the upper part 10 and the lower part 12 are provided, wherein the connecting elements 18 are spaced apart from one another along the longitudinal extent 8 of the wiper blade 2. The connecting elements 18 are designed in order to permit a movement of the upper part 10 and of the lower part 12 relative to each other with a movement component along the longitudinal extent 8 of the wiper blade 2. Furthermore, the connecting elements 18 are arranged relative to the lower part 12 in such a manner that, in an unloaded state of the wiper blade 2, an angle $\alpha_n$ of the respective longitudinal axes 24 of the connecting elements 18 relative to the lower part 12 at least partially changes along the longitudinal extent 8 of the wiper blade 2, in particular changes continuously or changes monotonously or strictly monotonously.

In the wiper blade illustrated in FIG. 6 in the unloaded state, the angles $\alpha_n$ of the respective longitudinal axes 24 of the connecting elements 18 relative to the lower part 12, which angles change along the longitudinal extent 8 of the wiper blade 2, are referred to by $\alpha_1, \alpha_2, \alpha_3, \ldots, \alpha_{n-1}, \alpha_n$. In a loaded state of the wiper blade 2, i.e. in a position placed against the windshield 4, as is illustrated by way of example in FIG. 7, the angles $\alpha_n$ of the respective longitudinal axes 24 of the connecting elements 18 relative to the lower part 12 change in comparison to the unloaded state. In order to convey this, the angles $\alpha_n$ of the respective longitudinal axes 24 of the connecting elements 18 relative to the lower part 12, which angles change along the longitudinal extent 8 of the wiper blade 2, are denoted in the wiper blade which is illustrated in FIG. 7 and which is in a position placed against the windshield by $\alpha'_1, \alpha'_2, \alpha'_3, \ldots \alpha'_{n-1}, \alpha'_n$.

According to embodiments of the windshield wiper device, which can be combined with other embodiments, the wiper blade 2 has at least one first region in which the angle $\alpha_n$ of the longitudinal axes 24 of the connecting elements 18 relative to the lower part 12 decreases along the longitudinal extent 8 of the wiper blade 2 toward a wiper blade end, in particular decreases monotonously, in particular strictly monotonously. Furthermore, the wiper blade 2 can have at least one second region in which the angle $\alpha_n$ of the longitudinal axes 24 of the connecting elements 18 relative to the lower part 12 increases along the longitudinal extent 8 of the wiper blade 2 toward a wiper blade end, in particular increases monotonously, in particular strictly monotonously. According to embodiments as illustrated by way of example in FIGS. 6 and 7, the second region of the wiper blade 2, in which the angle $\alpha_n$ of the longitudinal axes 24 of the connecting elements 18 relative to the lower part 12 increases along the longitudinal extent 8 of the wiper blade 2 toward a wiper blade end, is arranged at an inner position of the wiper blade that is located in the vicinity of the fastening device 30 of the wiper blade 2. This makes it possible to provide a windshield wiper device which permits particularly good adaptation to the curvature of a windshield 4. Furthermore, a substantially uniform contact pressure of the windshield wiper device against the windshield 4 and also a homogeneous distribution of force over the windshield wiper device can be provided, and therefore a high wiping quality is provided.

According to embodiments of the wiper blade 2, which can be combined with other embodiments, the connecting elements 18, in particular in an unloaded state of the wiper blade 2, are fastened to the lower part 12 in such a manner that the longitudinal axes 24 of the connecting elements 18 run at angles $\alpha_n$ with respect to the lower part 12, which angles lie between a lower angle limit value $\alpha_{nu}$ and an upper limit value $\alpha_{no}$. According to embodiments, the lower angle limit value is $\alpha_{nu}=10°$, in particular $\alpha_{nu}=15°$, in particular $\alpha_{nu}=20°$, and the upper angle limit value is $\alpha_{no}=80°$, in particular $\alpha_{no}=90°$, in particular $\alpha_{no}=100°$. This advantageously ensures a particularly good transmission of a force, which acts on the lower part 12, to the upper part 10.

According to embodiments of the windshield wiper device, which may be combined with other embodiments, the connecting elements 18 are configured in such a manner that the spacing between the upper part 10 and the lower part 12 at least partially changes along the longitudinal extent 8 of the wiper blade 2, in particular continuously decreases in a first region and continuously increases in a second region. The spacing between the upper part 10 and the lower part 12 along the longitudinal extent 8 of the wiper blade 2 may also include a region in which the spacing between the upper part 10 and the lower part 12 along the longitudinal extent 8 of the wiper blade 2 is substantially constant. The spacing between the upper part 10 and the lower part 12 is greater on the fastening part 30 than at the opposite end at which the connecting position 34 is located.

According to embodiments of the wiper blade 2, which may be combined with other embodiments, the inner spacing value (facing the fastening part) is at least 15 mm, in particular at least 25 mm, in particular at least 35 mm. According to embodiments which may be combined with other embodiments, the outer spacing value is at least 10 mm, in particular at least 12.5 mm, in particular at least 15 mm. According to embodiments which may be combined with other embodiments, the average spacing value is at least 7.5 mm, in particular at least 9 mm, in particular at least 12.5 mm.

As illustrated by way of example in FIGS. 6 to 7, the connecting elements 18 according to embodiments which may be combined with other embodiments are connected in an articulated manner to the lower part 12 and/or to the upper part 10. In particular, the connecting elements 18 are connected to the lower part 12 and/or to the upper part 10 by means of a first film hinge 20. The first film hinge 20 can be formed integrally with the connecting element 18 and the upper part 10 and/or the lower part 12. The integral configuration of the film hinges permits a simple and cost-effective production.

According to embodiments of the wiper blade, which may be combined with other embodiments described herein, the wiper blade comprises a first region with a first curvature $\omega<0$ and a second region with a second curvature $\omega>0$. Furthermore, the wiper blade according to embodiments may have a third region with a third curvature $\omega<0$, wherein the second region of the wiper blade is arranged with the second curvature $\omega>0$ between the first region with the first curvature $\omega<0$ and the third region with the third curvature $\omega<0$, as is shown by way of example in FIG. 6. A windshield wiper device can therefore be provided with which a substantially uniform contact pressure against the windshield 4 can be realized. Furthermore, a windshield wiper device can be provided which has improved adaptation to the windshield 4 and a high wiping quality.

According to further embodiments, in addition to a quick-fix fastening closure which can be used for Finray wipers and in which the entire windshield wiper device is removed from the drive shaft 33 on the vehicle, a mechanism can be provided in order to lift the wiper blade 2 of a windshield wiper device from the windshield 4 or to place said wiper blade onto the latter. This further simplifies the use, for example for manual cleaning of the windshield 4.

The invention claimed is:

1. A windshield wiper device for wiping a windshield (4) of a vehicle, the device comprising a wiper arm (1) with a wiper blade head (70) and a wiper blade (2) which comprises:
    an elongate upper part (10), which is configured to be at least partially bendable,
    an elongate lower part (12), which is configured to be at least partially bendable, and
    a plurality of connecting elements (18) for connecting the upper part (10) and the lower part (12), wherein the connecting elements (18) are spaced apart from one another along a longitudinal extent (8) of the wiper blade (2) and are attached to the upper part (10) and/or to the lower part (12) by means of a rotary joint (20),
wherein the connecting elements (18) each extend along a longitudinal axis (24) of the connecting element (18), which longitudinal axis runs from the upper part (10) to the lower part (12), and each extend along a transverse axis (25) running perpendicularly to the longitudinal axis (24), wherein the transverse axes (25) of at least two connecting elements (18) which are adjacent along the longitudinal extent (8) enclose a demolding angle ($\beta$) of at least 0.5° with respect to each other.

2. The windshield wiper device as claimed in claim 1, wherein the demolding angle ($\beta$) has a value within a range of 0.5° to 45°.

3. The windshield wiper device as claimed in claim 1, wherein the connecting elements (18) between the upper part (10) and the lower part (12) along the longitudinal extent (8) of the wiper blade (2) are arranged in such a manner that consecutive connecting elements (18) are pivoted about their respective longitudinal axes (24) toward the wiper blade head (70) and away from the latter in an alternating manner.

4. The windshield wiper device as claimed in claim 3, wherein the connecting elements (18) between the upper part (10) and the lower part (12) along the longitudinal extent (8) of the wiper blade (2) are pivoted alternately about their longitudinal axes (24) in such a manner that a constant demolding angle ($\beta$) is provided between the transverse axes (25) of adjacent connecting elements (18).

5. The windshield wiper device as claimed in claim 1, wherein the upper part (10) and/or the lower part (12) and/or one or more connecting elements (18) contain a material which is selected from the group which consists of a polymethylmethacrylate, a polymer, a fiber composite material, carbon, POM, PA, TPE, in particular TPE-S, TPE-O, TPE-U, TPE-A, TPE-V, TPE-E, . . . , or any combination thereof.

6. The windshield wiper device as claimed in claim 1, wherein the wiper blade head (70) together with the wiper blade (2) form an integral component made by injection molding.

7. The windshield wiper device as claimed in claim 1, wherein the connecting elements (18) and/or the rotary joints (20) have a virtually constant wall thickness (19), wherein the wall thickness (19) lies within a range of between 0.3 mm and 5 mm.

8. The windshield wiper device as claimed in claim 1, wherein the connecting elements (18) are configured to permit a movement of the upper part (10) and of the lower part (12) relative to each other with a movement component along the longitudinal extent (8) of the wiper blade (2).

9. The windshield wiper device as claimed in claim 1, wherein the demolding angle ($\beta$) has a value within a range of 1° and 10°.

10. The windshield wiper device as claimed in claim 1, wherein the demolding angle (β) has a value of approximately 3°.

11. The windshield wiper device as claimed in claim 1, wherein the connecting elements (18) and/or the rotary joints (20) have a virtually constant wall thickness (19), wherein the wall thickness (19) of the rotary joints lies within a range of between 0.2 mm and 1 mm, and wherein the wall thickness of the connecting elements lies within a range of 1 mm to 5 mm.

12. A method for producing a wiper blade (2) for a windshield wiper device, wherein the method comprises:

provi­ding an injection molding die (40) suitable for the injection molding of the wiper blade (2), wherein the wiper blade (2) has an elongate upper part (10), an elongate lower part (12) and a plurality of connecting elements (18) for connecting the upper part (10) and the lower part (12), wherein the connecting elements (18) are spaced apart from one another along a longitudinal extent (8) of the wiper blade (2) and are attached to the upper part (10) and/or to the lower part (12) by means of a rotary joint (20), wherein the connecting elements (18) are each extended along a longitudinal axis (24) of the connecting element (18), which longitudinal axis runs from the upper part (10) to the lower part, and along a transverse axis (25) running perpendicularly to the longitudinal axis (24), wherein the transverse axes (25) of at least two connecting elements (18) which are adjacent along the longitudinal extent (8) enclose a demolding angle (β) of at least 0.5° with respect to each other;

injection molding the wiper blade (2) using the injection molding die (40) provided with the demolding angle (β); and demolding the wiper blade (2) from the injection molding die (40).

13. The method as claimed in claim 12, wherein the injection molding of the wiper blade (2) is carried out using plasticized plastic.

14. The method as claimed in claim 12, wherein the injection molding of the wiper blade (2) is carried out with an injection molding die (40) which has trapezoidal demolding blocks (41, 42).

* * * * *